US010455948B2

(12) United States Patent
Guschmer

(10) Patent No.: US 10,455,948 B2
(45) Date of Patent: Oct. 29, 2019

(54) MULTIMEDIA CHAIR

(71) Applicant: Jorge Guschmer, Guayaquil (EC)

(72) Inventor: Jorge Guschmer, Guayaquil (EC)

( * ) Notice: Subject to any disclaimer, the term of this patent is extended or adjusted under 35 U.S.C. 154(b) by 26 days.

(21) Appl. No.: 15/787,907

(22) Filed: Oct. 19, 2017

(65) Prior Publication Data

US 2019/0082852 A1 Mar. 21, 2019

Related U.S. Application Data

(60) Provisional application No. 62/561,242, filed on Sep. 21, 2017.

(51) Int. Cl.
*A47C 7/72* (2006.01)
*G07F 17/08* (2006.01)
*A47C 7/50* (2006.01)
*H04W 88/08* (2009.01)
*A47C 1/037* (2006.01)
*A47C 1/024* (2006.01)
*A47C 7/70* (2006.01)
*H02J 7/00* (2006.01)
*H04W 84/12* (2009.01)

(52) U.S. Cl.
CPC ............... *A47C 7/72* (2013.01); *A47C 1/024* (2013.01); *A47C 1/037* (2013.01); *A47C 7/506* (2013.01); *A47C 7/70* (2013.01); *G07F 17/08* (2013.01); *H04W 88/08* (2013.01); *H02J 2007/0062* (2013.01); *H04W 84/12* (2013.01)

(58) Field of Classification Search
CPC ..... A47C 1/03238; A47C 1/037; A47C 17/08; A47C 7/506; G07F 17/08
See application file for complete search history.

(56) References Cited

U.S. PATENT DOCUMENTS

| 2,564,762 | A | * | 8/1951 | Howard | G07F 17/08 194/241 |
| 2,988,192 | A | * | 6/1961 | Hower | G07F 17/08 194/234 |
| 3,237,986 | A | * | 3/1966 | Flint | A47C 1/023 297/309 |
| 5,857,986 | A | | 1/1999 | Moriyasu | |
| 6,895,316 | B2 | | 5/2005 | Chen et al. | |
| 7,794,014 | B2 | | 9/2010 | Beall et al. | |
| 8,113,517 | B2 | | 2/2012 | Canterbury et al. | |
| D699,043 | S | | 2/2014 | McNae | |
| 9,730,518 | B1 | * | 8/2017 | Jacobs | A47C 31/008 |

(Continued)

*Primary Examiner* — David R Dunn
*Assistant Examiner* — Christopher E Veraa
(74) *Attorney, Agent, or Firm* — Allen, Dyer, Doppelt + Gilchrist, P.A.

(57) ABSTRACT

A multimedia chair includes a base, seat support, seat, opposing side supports, and arm rests supported on the opposing side supports. A controller is supported by an arm rest attached to a side support, and a display and multimedia module are supported and connected to a controller supported by one of the arm rests. An adjustable foot support and reclinable back seat are actuated by a user authorization module, wherein upon receiving a credit card authorization or wireless authorization signal from a wireless device, the seat is enabled for use. The reclinable back seat is pivotally connected to one of the opposing side supports and an adjustable foot support is pivotally attached to the seat.

18 Claims, 9 Drawing Sheets

(56) References Cited

U.S. PATENT DOCUMENTS

| | | | |
|---|---|---|---|
| 2004/0004376 A1* | 1/2004 | Cabebe | A47C 7/54 297/217.1 |
| 2004/0007907 A1* | 1/2004 | DiRe | A61C 19/00 297/217.3 |
| 2007/0001499 A1* | 1/2007 | Smith | A47C 1/022 297/362.13 |
| 2009/0152915 A1* | 6/2009 | Krasna | A47C 1/0342 297/217.3 |
| 2011/0049956 A1* | 3/2011 | Spivey | A47C 1/03294 297/354.12 |
| 2011/0109134 A1 | 5/2011 | Filipour et al. | |
| 2017/0190271 A1 | 7/2017 | Patrick et al. | |
| 2017/0293281 A1* | 10/2017 | Li | G05B 19/16 |

\* cited by examiner

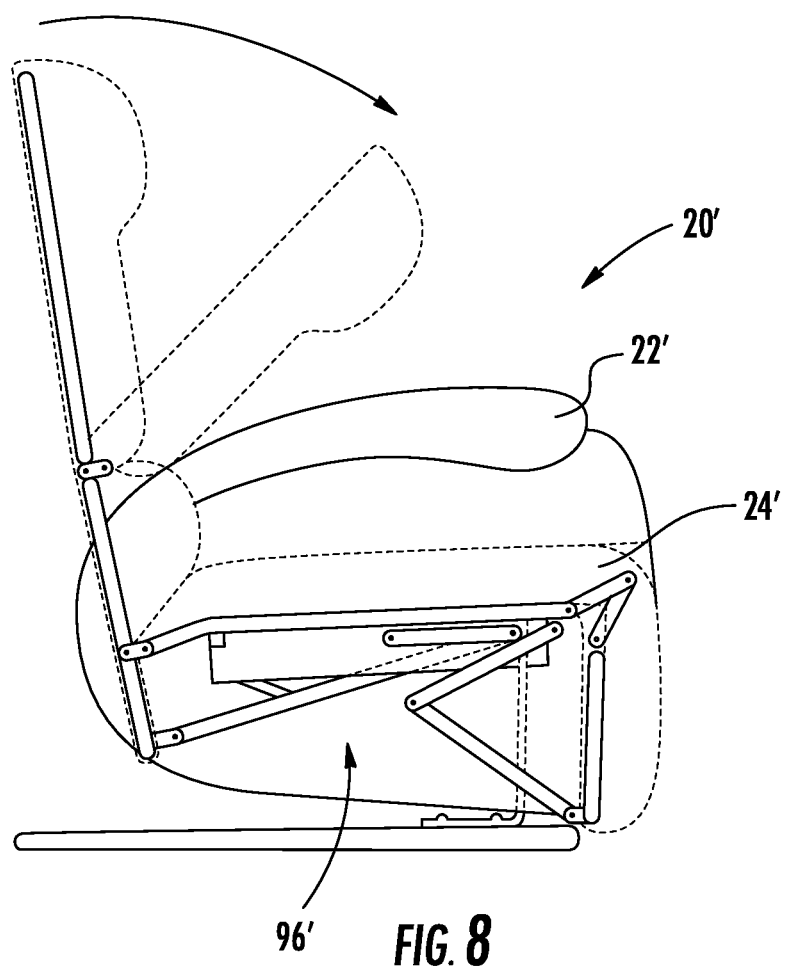

MULTIMEDIA CHAIR

PRIORITY APPLICATION(S)

This application is based upon U.S. provisional application Ser. No. 62/561,242 filed on Sep. 21, 2017, the disclosure which is hereby incorporated by reference in its entirety.

FIELD OF THE INVENTION

This invention relates to multimedia chairs, and more particularly, to a multimedia chair operable between disabled and enabled positions.

BACKGROUND OF THE INVENTION

Meeting rooms in airports, train stations, bus stations or malls have numerous seats, but do not provide multimedia capability. Often if a user wants multimedia capability, they have to use their own laptop computer, portable phone, or tablet and connect to WiFi to obtain network services at a hot spot in an airport or in a mall. Often the user must sit at a table that has a charging station and WiFi capability and near many other persons who are in similar circumstances and who are also using their laptop computers, portable phones, or tablets. Sometimes depending on the area and which network provides the WiFi service, the provider charges the user for the WiFi use, which may require the user to enter a credit card number in what may be an unsecure area where the user's credit card security may be compromised. Even with a secure payment, there is little privacy at these tables and in close confines to other WiFi users on their devices. Also, the circumstances and close confines of those sitting at a table with many other users may be uncomfortable to some.

General seating in the waiting areas or similar locations may provide some relief, but these seats may be used by anyone. Free seating with an internet plug-in would also be wasteful because many who are not using the WiFi or internet service may want to sit in that seat. For that reason, there is a need to provide a multimedia seat, i.e., chair, where those that require the use of multimedia services would have seating availability and would be willing to pay for the seating and multimedia use. Such a seat should be readily manufactured without difficulty, easy to use, simple in design, have a minimal footprint, and be disabled unless payment by a user is made.

SUMMARY OF THE INVENTION

A multimedia chair includes a base having opposing seat supports and opposing side supports and a seat connected to the seat support. An arm rest is attached to each side support. A controller is included, and in an example, supported by the multimedia chair and a display is supported by one of the arm rests and connected to the controller. A multimedia module is connected to the controller. An adjustable foot support is pivotably attached to the seat. A foot support locking device is connected to the adjustable foot support and the controller and activated by the controller. The adjustable foot support is initially in a stowed, locked and disabled position when the multimedia chair is not in use and optionally extends outward when the foot support locking device is activated by the controller and unlocked.

A back seat is pivotally connected to the opposing side supports. A back seat locking device is connected to the back seat and the controller and activated by the controller, wherein the back seat is initially in a forward, locked and disabled position making the multimedia chair unusable when activated by the controller and movable rearward into an enabled position for use of the multimedia chair when the back seat locking device is unlocked. A user authorization module is connected to the controller. Upon receiving a credit card authorization or wireless authorization signal from a wireless device by a potential user, the controller unlocks the foot support locking device and back seat locking device and actuates the display and multimedia module for use of the multimedia chair by the user.

In one example, the seat and back seat each include a vibrating element connected to the multimedia module and controlled therefrom for imparting a vibrating sensation to the user. In yet another example, the display is pivotally supported by one of the arm rests and movable from a retracted position when the multimedia chair is not in use and into an extended position when in use. An adjustable table may connect to the arm rest that supports the display. Each seat support may comprise a flange and the seat is configured to be slidably received on each flange.

The back seat may further comprise a support rod pivotably connected between the side supports and a back seat member supported by the support rod. In an example, the authorization module comprises a credit card reader carried by one of the arm rests. The controller is positioned within one of the arm rests. A biasing mechanism may be connected to the back seat and configured to bias the back seat into the forward, locked and disabled position.

In yet another example, the multimedia chair includes a base having opposing seat supports and opposing side supports and a seat connected to the seat supports. An arm rest is attached to each side support. A controller is included and may be supported by the multimedia chair and a display is supported by one of the arm rests and connected to the controller. A multimedia module is connected to the controller. An adjustable foot support is pivotably attached to the seat. A foot support locking device is connected to the adjustable foot support and controller. The adjustable foot support is initially in a stowed, disabled position when the multimedia chair is not in use and optionally extends outward when the foot support locking device is actuated by the controller and unlocked. A back seat includes a support rod pivotably connected between the side supports, a support plate carried by the support rod, and a back seat member carried by the support plate. A back seat locking device is supported by one of the side supports and actuated by the controller and comprises a locking pin that engages the support rod to lock the back seat into a forward, locked and disabled position.

A credit card reader is connected to the controller. Upon reading a credit card of a potential user, and receiving credit approval, the controller unlocks the foot support locking device and back seat locking device and actuates the display and multimedia module for the use of the multimedia chair by the user. The support rod includes a mounting groove and the support plate includes an edge configured to fit within the mounting groove. The back seat member include side channels that are slidably received on the support plate to retain the back seat member thereon.

DESCRIPTION OF THE DRAWINGS

Other objects, features and advantages of the present invention will become apparent from the detailed description of the invention, which follows when considered in light of the accompanying drawings in which:

FIG. 8 is a fragmentary side elevation view of a second embodiment of the framework of a multimedia chair that may be used.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The multimedia chair, in accordance with a non-limiting example, may also be referred to as a multimedia seat. The multimedia chair is useful in a waiting room at an airport, a train station, a bus station, a mall, or similar location where persons may have to wait for transportation or an event or other reason and may provide a distraction during waiting time such as occurs in boarding or waiting rooms at airports and similar locations. In an example, a user's credit card may be charged or a wireless authorization signal transmitted to the multimedia chair and used to activate the functions and services of the multimedia chair, which maintains a reclining forward position when disabled and not in use and makes it impossible for a user to sit on the chair.

In operation, the user inserts a credit card into the credit card reader or sends a wireless authorization signal from a wireless device into a user authorization module, which could be the credit card reader, so that once the seat is activated, the seat may be manually pivoted rearward for use. A foot rest is also unlocked. The multimedia chair offers greater comfort than traditional seats or benches when a user is waiting in various waiting rooms in bus and train stations, airports or shopping centers and provides multimedia content on demand with the possibility of online shopping, online games, and WiFi service while providing use of hot spots for family members and e-commerce at duty free shops located at the ports of entry and exits of countries.

The display includes a touch screen in a preferred example and may include an integrated credit card payment system, such as a credit card reader or touch screen options. The adjustable table operates as a work table and includes in one example a non-slip rubber or similar pad surface and different USB plugs for charging laptops, tablets, cell phones and similar devices, which can be plugged into the display or in an arm rest. The touch screen may offer different possibilities to a user such as shopping on the Internet, a social network for the seat users, online games, content on demand, and information about the establishment where the seat is located.

Figure 1:
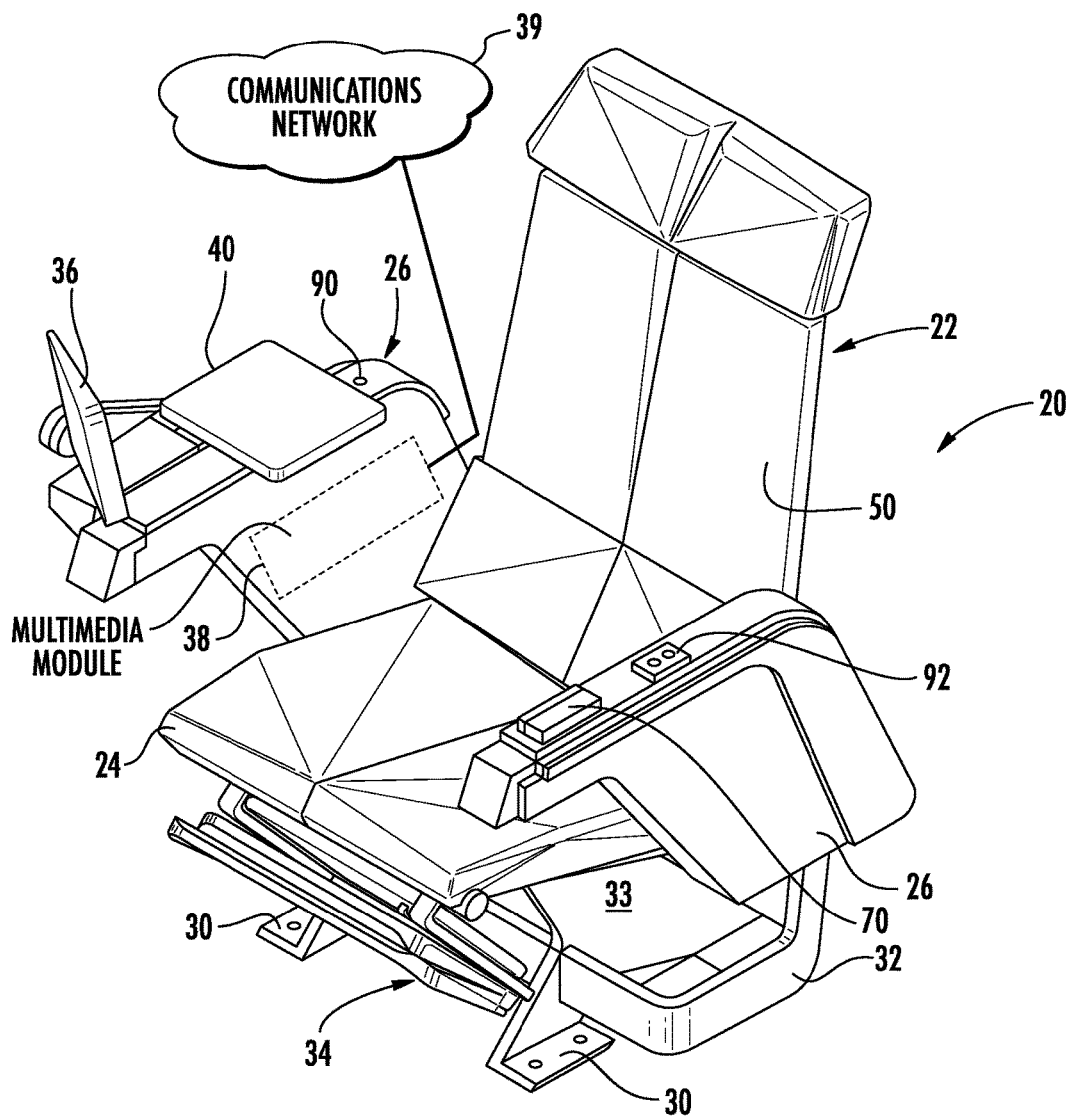
FIG. 1 is an enlarged front perspective view of the multimedia chair in accordance with a non-limiting example.
Figure 3:
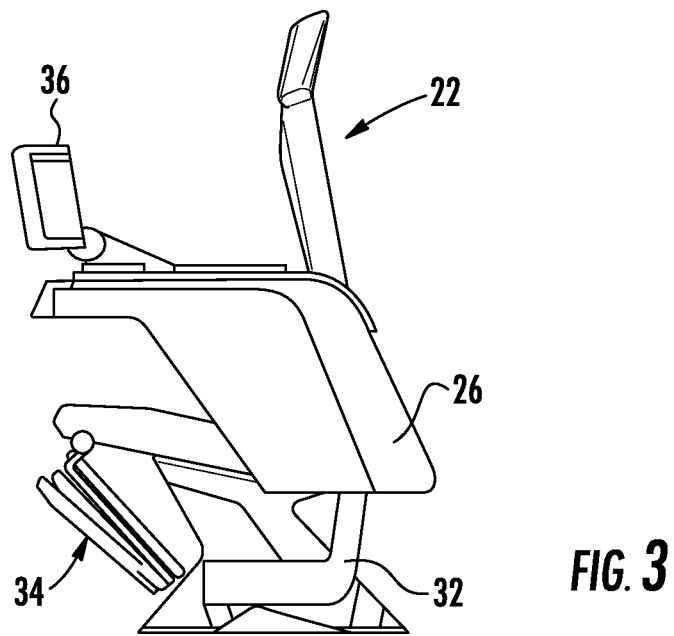
FIG. 3 is a side elevation view of the multimedia chair of FIG. 1 in a disabled position.
Figure 4:
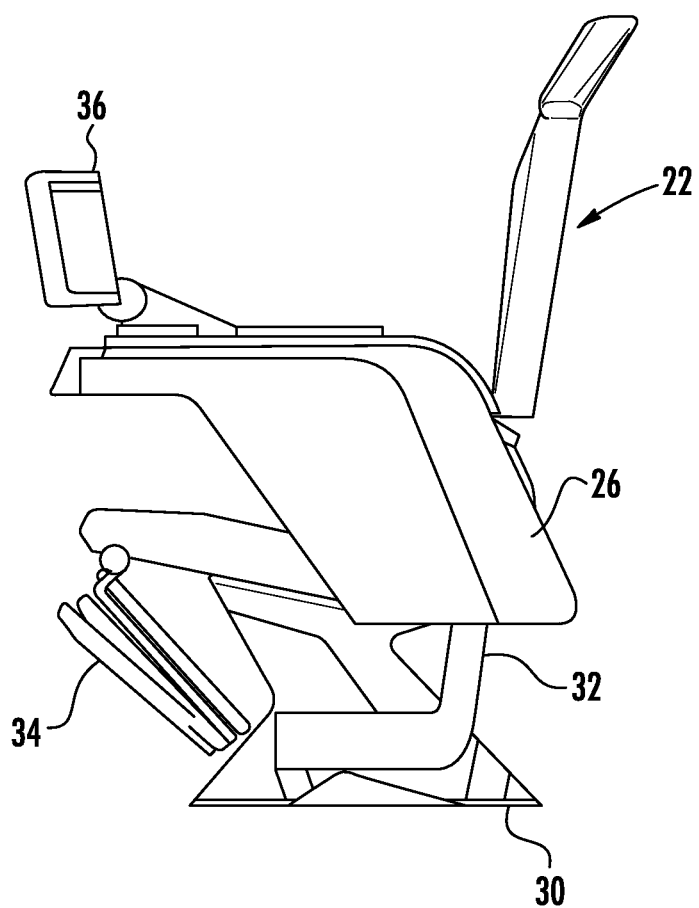
FIG. 4 is a side elevation view of the multimedia chair in an enabled position for use.

Referring now to FIG. 1, there is illustrated the multimedia chair indicated generally at 20 in an enabled position and includes a back seat 22 and seat 24 and in the enabled position, the seat is reclined back at an angle, but in a non-enabled position, it is inclined forward at an example 15 degree inclination, thus making the multimedia seat unusable. As explained in detail below, FIG. 2 of the multimedia chair 20 shows example but representative dimensions such as the height of the chair 20 at dimension "a" at about 3 feet and 3⅞ inches, height of the seat 24 corresponding to "b" from ground at about 1 foot and 3⅛ inches, height of the arm rests 26 corresponding to "c" from the lower part of the seat at about 1 foot and 2⅞ inches, the width of the base 28 of the chair at its floor supports 30 corresponding to "d" at about 1 foot and 6¼ inches, and the distance "e" of the side supports 32 and seat supports 33 at about 2 feet and 3⅝ inches, as non-limiting examples that have been found advantageous for use. When the back seat 22 is angled toward the front position of about 15 degrees as shown in FIG. 3, the multimedia chair 20 is disabled and may not be used. When a potential user's credit card is charged or wireless authorization signal is received, the back seat 22 is unlocked and may be pivotally moved rearward as shown in FIGS. 1 and 4 and also the adjustable foot support 34 is unlocked and may be used. Also, the display 36 and multimedia module 38 (shown by the dashed lines in FIG. 1), including the adjustable table 40 as explained in greater detail below, may then be used.

Figure 5:
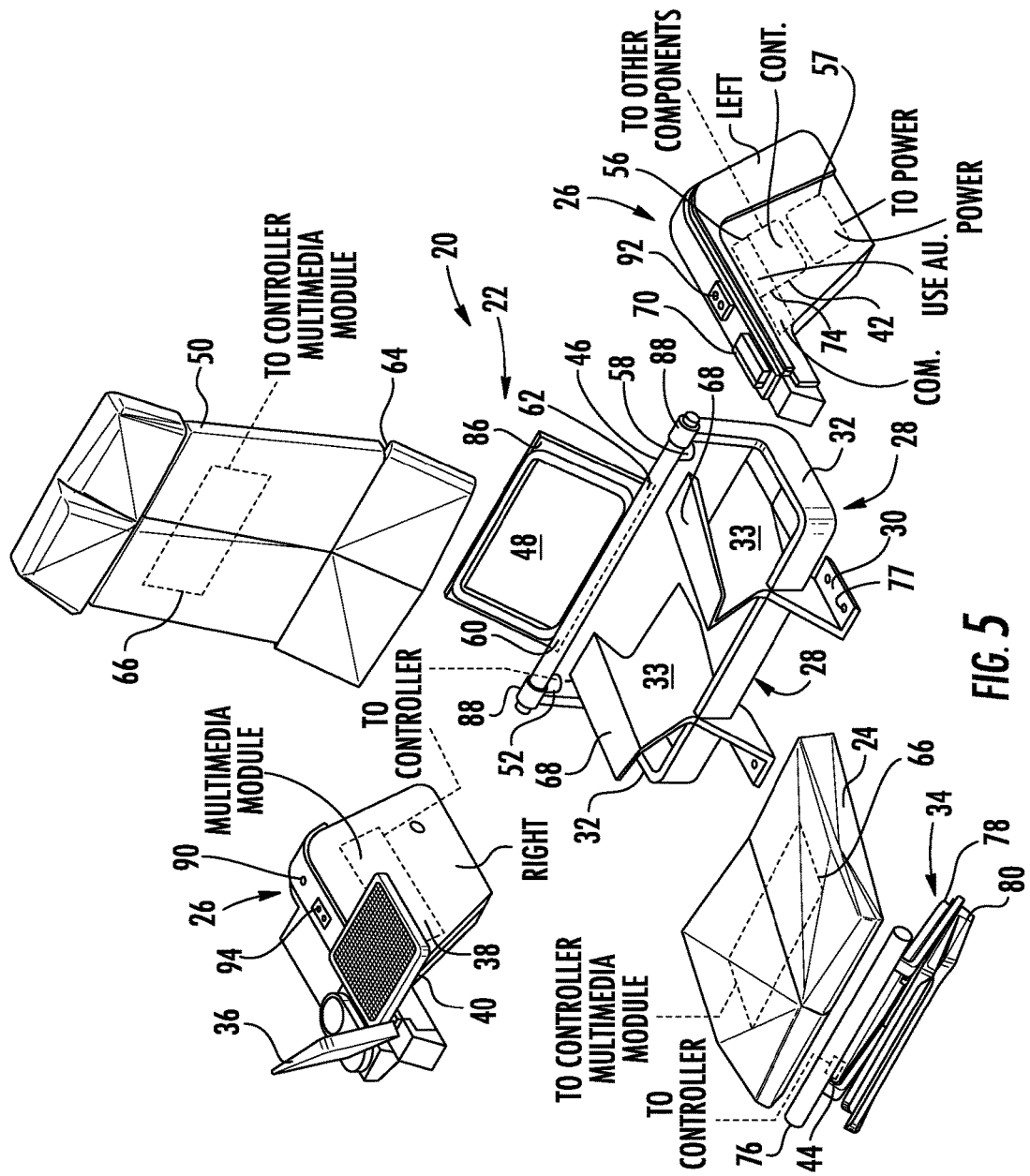
FIG. 5 is an exploded isometric view of the multimedia chair of FIG. 1.

Other components of the multimedia chair 20 are best shown in FIG. 5 and explained in greater detail below. These multimedia chair 20 components include the controller 42 that may be supported within an arm rest 26 and connected to the multimedia module 38 by wired or wireless connection. A foot support locking device 44 is connected to the adjustable foot support 34 and the controller 42. The back seat 22 includes a support rod 46 pivotally connected between the side supports 32 and a support plate 48 carried by the support rod. A back seat member 50 is carried by the support plate 48. A back seat locking device 52 is supported by one of the side supports 32 and actuated by the controller 42 to unlock the back seat so it can be pivoted rearward into an enabled position. This locking device 52 includes a locking pin 54 (best shown in FIG. 5A) mounted in a lock housing 55 that engages the support rod to lock the back seat 22 into a forward, locked and disabled position. A user authorization module 56 is connected to the controller 42. Upon receiving a credit card authorization or wireless authorization signal from a wireless device of a potential user, the controller 42 unlocks the foot support locking device 44 and back seat locking device 52 and activates the display 36 and multimedia module 38 for use of the multimedia chair 20 by the user. A power module 57 connects to a source of external power in one example and can power components of the multimedia chair 20.

The adjustable foot locking device 44 may also be designed similar to the back seat locking device 52 and use a locking pin mechanism that engages a pivotably mounted support rod as explained in greater detail below. In an example, the back seat biasing mechanism 58 is connected to the back seat 22 and configured to bias the back seat into the forward, locked and disabled position. It may be formed of a spring or other mechanical or electromechanical system. The support rod 46 as part of the back seat 22 may include a mounting groove 60 and the support plate 48 may include an edge 62 configured to fit within the mounting groove 60, such as by a frictional fit. The back seat member 50 may include side channels 64 such as a locking channel that are slidably received on the support plate 48 to retain the back seat member thereon.

In yet another example, the seat 24 and the back seat member 50 each include a vibrating element 66 connected to the multimedia module 38 and controlled therefrom for imparting a vibration sensation to the user. The display 36 is pivotally supported by one of the arm rests 26 and movable from a retracted position when the multimedia chair 20 is not in use and into an extended position when in use as shown in FIG. 1. In an example, the adjustable table 40 is connected to the arm rest 26 that supports the display 36. Each seat support 33 may include a seat mounting flange 68 and the seat 24 is configured to be slidably received on each seat mounting flange 68. In an example, the user authorization module 56 includes a credit card reader 70 that is carried by one of the arm rests 26. Other components may include power outlets 72 and the user authorization module 56 may include a communications module 74 that receives the wireless authorization signals from the wireless device of a user as an alternative technique to authorize use of the multimedia chair 20. As noted before, the adjustable foot support 34 may also include a support rod 76 similar to the support rod of the back seat 22.

As noted before, the multimedia chair 20 includes the base 28 having the floor supports 30 that may secure the multimedia chair 20 onto the floor by bolts 77 or other attachment mechanisms. The base 28 includes the opposing, in this case, left and right seat supports 33, each having the horizontal seat mounting flange 68, which slidably receives the seat 24.

In this example, the floor supports 30 are integrated with the opposing seat supports 32 that extend upward from the floor supports and then form the seat mounting flanges 68 as illustrated. The seat mounting flanges 68 are horizontally disposed at 90 degrees relative to the vertically oriented section of the opposing left and right seat supports 33. The seat mounting flanges 68 are tapered outwardly from front to rear so that the front portion corresponding to the front portion of the multimedia chair 20 is smaller in width than the rear section. Thus, the seat 24 may be slidably received and engaged and retained on the seat mounting flanges 68 of the seat supports 33 such as in a frictional engagement via a locking channel 64 on the underside of the seat at either edge. The base 28 also includes the opposing, i.e., left and right side supports 32, which in this example are formed as a continuously shaped bar with a front portion that intersects the opposing seat supports 32 and extend rearward and upward similar to a reverse L-configuration as illustrated in FIG. 5. In this example, the foot support locking device 44 is actuated by the controller 42 when a user authorizes use of the multimedia chair 20 such as by a credit card read from the credit card reader 70 or via a wireless signal sent from a mobile phone that activates the chair via the communications module 74 as part of the authorization module 56.

A left and right arm rest 26 is attached to each left and right side support 32 and the controller 42 is supported by one of the arm rests 26 as illustrated, in this example, the left arm rest. The controller 42 and multimedia module 38 may be supported within a cavity of the respective left and right arm rest 26 and connected to the authorization module 56, which also may be supported in the same arm rest with the communications module 74 for the user authorization module 56. The display 36 and the multimedia module 38 are both supported by one of the arm rests 26, in this example, the right arm rest, and connected to the controller 42. The connection could be wired and wires may extend along the base 28 or wireless and the multimedia module could also include a wireless communications device. The multimedia module 38 may connect to the Internet or other communications network 39 via wired or wireless connection, including WiFi.

The adjustable foot support 34 is pivotably connected to the seat 24 at its front portion such as via the support rod 76 mounted for pivotal movement at the front portion of the seat 24. The foot support locking device 44 as illustrated is connected to the adjustable foot support 34 via the pivotably mounted support rod 76 and also connected to the controller 42. This adjustable foot support 34 is initially stowed and pivoted inwardly in a disabled position as illustrated, for example, in FIG. 3, when the multimedia chair 20 is not in use, but optionally extends outward when the foot support locking device 44 is unlocked via credit card or mobile phone authorization.

The foot support locking device 44 is actuated by the controller 42 and may be mounted under the seat 24 adjacent the support rod 76 that connects to a first section of the adjustable foot support formed as a first foot support plate 78. A top edge of that first plate 78 is connected to the support rod 76 and the bottom edge is connected to a second pivoting section as a second foot support plate 80. When the controller 42 actuates the foot support locking device 44 and it is unlocked, the user may move the first and second plates 78,80 outward as a foot rest such as shown in the example of the left side multimedia chair 20 of FIG. 8.

Figure 5A:
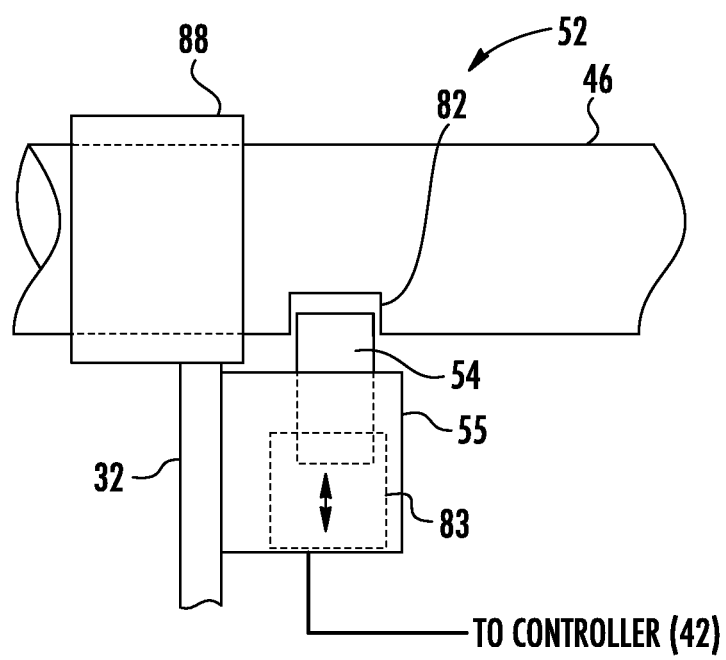
FIG. 5A is a fragmentary and partial schematic view of the back seat locking device that can be used with the multimedia chair.

The foot support locking device 44 may also include a lock housing 45 supported under the seat 24. It can be similar to the back seat locking device 52. In an example of the back seat locking device 52, it includes the locking pin 54 that is actuated to move into and out of a locking recess 82 formed in the support rod 46 so that when the locking pin is extended into the support rod, the back seat 22 is locked into that 15 degree forward position and may not be used (FIG. 5A). An actuator 83 connected to the controller 42 may be actuated to drive the locking pin 54 into the locking recess 82.

The back seat 22 is pivotally connected between the opposing side supports 32. As illustrated, the back seat 22 includes its support rod 46 pivotably connected between the side supports 32. The support plate 48 is carried by the support rod 46 and the back seat member 50 is carried by the support plate. The back seat locking device 52 may have a similar design as the foot support locking device 44 and may be supported by one of the side supports 32 and actuated by the controller 42. It includes the locking pin 54 as shown in FIG. 5A and extends out of the lock housing 55 to engage the support rod 46 and lock the back seat 22 into a forward, locked and disabled position. As noted before, the support rod 46 includes the mounting groove 60 and the support plate 48 includes an edge 62 configured to fit within the mounting groove so that it can be quickly added during assembly and retained therein. An adhesive may be used, or if metallic parts are used, then spot welds or similar welding may be used. An interference fit could also be used and preferred in some cases since it would facilitate assembly. Also, fasteners could be used.

As noted before, the back seat member 50 includes side channels 64 formed as U-shaped channels as locking channels that can be received over side mounting edges 86 positioned on the side edges of the support plate 48 and are slidably received on the support plate 48 to retain the back seat member thereon. The back seat member 50 includes appropriate cushioning on a frame assembly that includes the side channels 64. Positioned at the upper, vertical part of the side supports 32 corresponding to the "L" portion may be support rod receiving channels 88 that could be configured similar to short sections of pipe that receive the support rod 46 to allow the pivoting motion relative to the side supports 32. During assembly of the multimedia chair, the inside panels of the arm rests 26 could be attached to the respective side supports 32 and the support rod 46 inserted and positioned within the support rod receiving channels 88 to allow pivoting movement and the back seat locking device 52 engaged with the support rod 46. After insertion of the support rod 46, the support plate 48 may then be inserted, which locks the support rod 46 in position for pivoting movement. Other sections of the left and right arm rests 26 may then be attached. This is only one non-limiting example of an assembly method. It is also advantageous to allow components to be mounted within the arm rests 26, such as the controller 42, multimedia module 38 and communications module 74.

Figure 2:
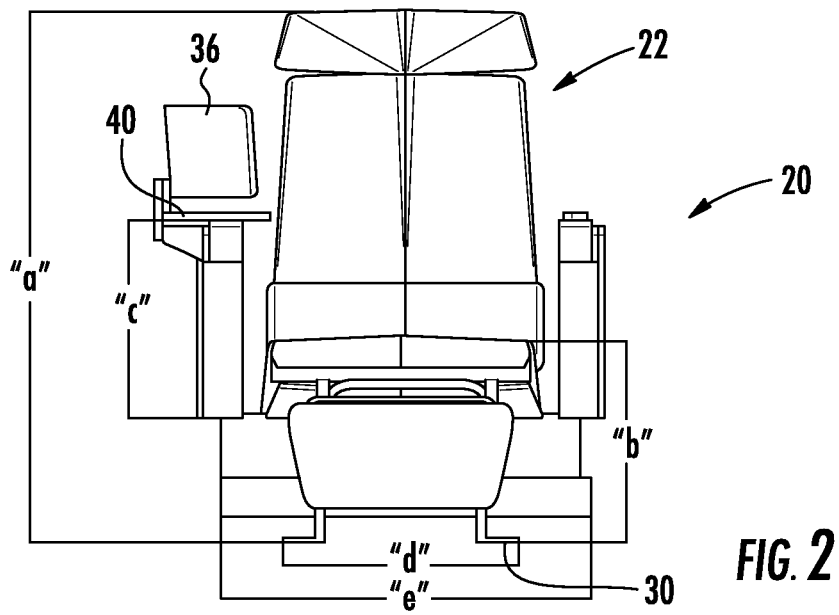
FIG. 2 is a front elevation view of the multimedia chair of FIG. 1.

The back seat 22 is initially in a forward, disabled position as shown in FIG. 2 and angled in a 15 degree forward inclination, making the multimedia chair unusable. The user authorization module 56 such as including the credit card reader 70 is connected to the controller 42 and as illustrated, positioned on the left arm rest 26, but could be positioned on either front or right arm rests or another location on the multimedia chair 20 that may be readily accessible by the user to actuate the controller. Upon reading a credit card by a potential user or receiving the wireless authorization signal and/or receiving credit approval, the controller 42 unlocks the foot support locking device 44 and back seat locking device 52 and actuates the display 36 and multimedia module 38 for use of the multimedia chair 20 by the user.

In an example as described above, the seat 24 and back seat member 50 each include a vibrating element 66 that may be controlled by the multimedia module 38 for imparting a vibrating sensation to the user. The multimedia module 38 may control the amount of vibration via the display 36 and its touch screen so that the user can select the amount of vibration from no vibration to a maximum vibration. The seat 24 and back seat member 50 are covered with appropriate cushion material and includes an appropriate mounting mechanism to support the vibrating elements. There are numerous and different vibrating elements that can be used and selected by those skilled in the art.

As illustrated, the display 36 is pivotably supported by the right arm rest 26 and movable from a retracted position when the multimedia chair 20 is not in use and disabled and into an extended position when in use and the multimedia chair 20 is enabled. The display 36 may be pivotably attached on a support rod or other pivoting support member and pivoted toward the user once the user is seated in the multimedia chair 20. Likewise, the adjustable table 40 is connected to the same left arm rest 26 and may be pivoted downward when the chair is disabled and the back seat 22 is locked in its forward position and disabled, but may be extended upward once the multimedia chair 20 is enabled.

In an example, the left arm rest 26 supports the controller 42 that is connected to the foot support locking device 44 and the back seat locking device 52 so that upon credit card authorization or receiving the wireless authorization signal from a user's mobile phone, which may include credit card information, the controller unlocks the locking devices 44,52 to allow a user to manually move and adjust the back seat 22 rearward in a desired position. Additionally, the adjustable foot support 34 may be adjusted into a desired position. The multimedia module 38 may be supported within the right arm rest 26 as illustrated and also may include a head phone jack 90. The right arm rest 26 includes the display 36 and the adjustable table 40 and the interior of the arm rest may include additional storage, cables, electronics for the display and other components. Power outlets 92 may be contained on one or both left and right arm rests 26, and as illustrated, are included on the left arm rest adjacent the credit card reader 70. The adjustable table 40 may unfold from one of the arm rests 26 and in this example, the left arm rest 26 and includes a non-slip surface, such as a rubber or other high friction surface that prevents electronic devices such as laptops, cell phones, or tablets from slipping off of the top surface of the adjustable table. One or both arm rests 26 and especially that supporting the adjustable table may include one or more, and in an example, two USB ports 94 for powering mobile devices such as tablets, laptops, and cell phones.

Figure 6A:
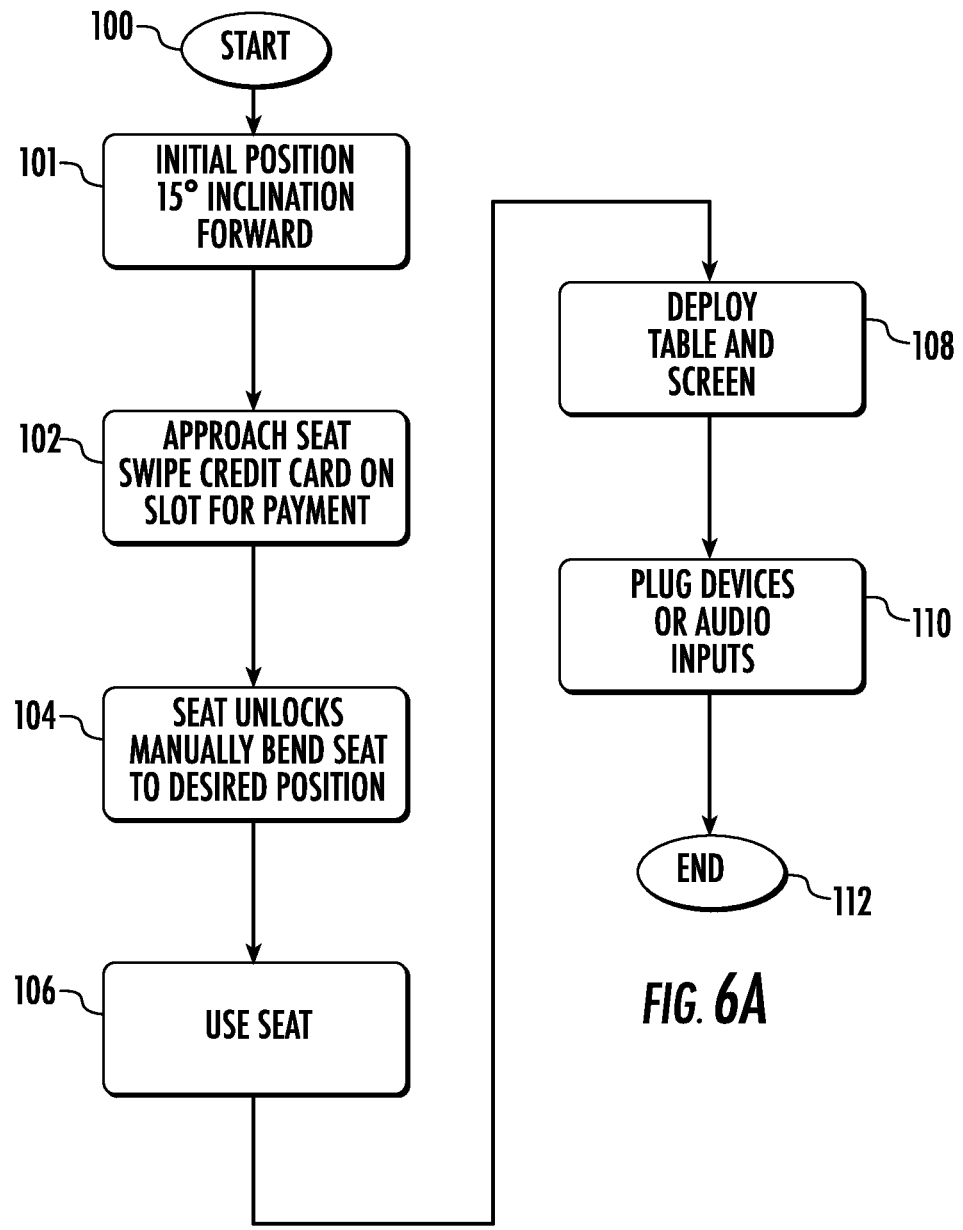
FIG. 6A is a flow diagram illustrating how a user enables the multimedia chair of FIG. 1 for use.

Referring now to FIG. 6A, there is illustrated an example flowchart of the activation process of the multimedia chair 20. The process starts (Block 100) when a potential user approaches the multimedia chair 20 for use. When disabled, the seat maintains an initial position of 15 degrees forward as shown at Block 101 and is unusable. Once the user approaches the multimedia chair as a waiting multimedia chair 20, the user slides a credit card within the credit card reader 70 (or activates via their phone) to pay for the chair service and enables the multimedia chair, i.e., the waiting seat (Block 102). Alternatively, as noted before, the mobile phone or tablet could be used to enable the multimedia chair. When the authorization clears, such as when payment is accepted, the controller 42 unlocks the back seat locking device 52 and the foot support locking device 44 so that the user can move the back seat 50 manually into a desired position for seating as illustrated at Block 104. The user may then use the multimedia seat as shown at Block 106. The adjustable table may be deployed with the display as a touch screen (Block 108) and various devices plugged into the head phone jack and outlets (Block 110) and the process ends (Block 112).

Figure 6B:
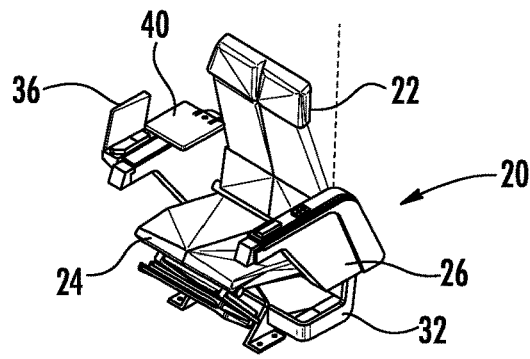
FIG. 6B is a perspective view of the multimedia chair of FIG. 1 in the disabled position.
Figure 6C:
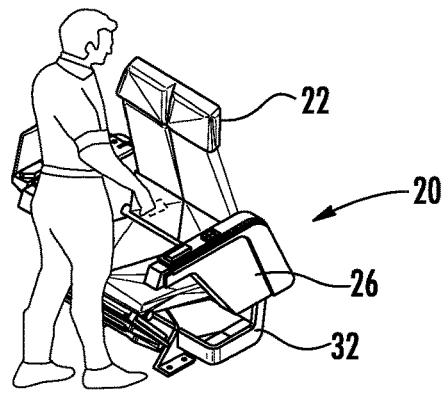
FIG. 6C is a perspective view of the multimedia chair showing it enabled by a potential user.
Figure 6D:
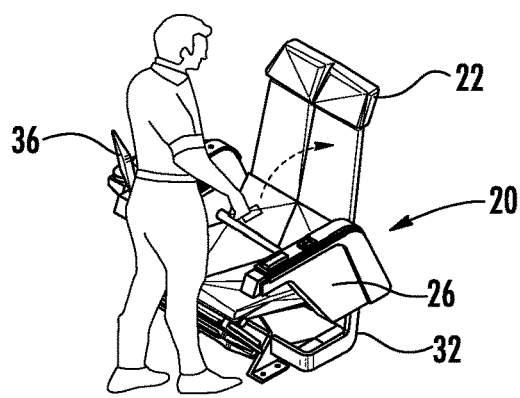
FIG. 6D is a perspective view of the multimedia chair with the back seat manually bent rearward.
Figure 6E:
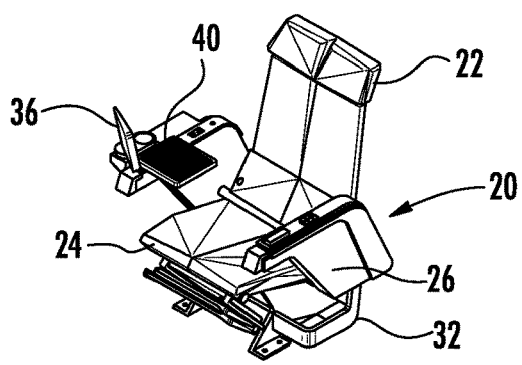
FIG. 6E is a perspective view of the multimedia chair operative for use.

FIGS. 6B-6E show perspective views of the multimedia chair 20 with a potential user shown in FIGS. 6B-6D enabling the chair. In FIG. 6B, the multimedia chair 20 is in the initial position where it is inclined 15 degrees forward and locked. The potential user has approached the multimedia seat as shown in FIG. 6C and swipes their credit card on the slot of the credit card reader 70 for payment or alternatively enable and pay via the mobile phone. As shown in FIG. 6D, the multimedia seat 20 unlocks and the user manually bends the seat backward into a desired position. As shown in FIG. 6E, the seat is in its usable enabled position with the display and adjustable table extended for use.

The multimedia module 38 may allow for the connection of wired headsets or wireless headsets using a Bluetooth configuration via control from the touch screen and a wireless module as part of the multimedia module. It is also possible to continue viewing contents displayed at the multimedia chair or on a phone by downloading a mobile application and entering a security code that is provided on the screen of the display. It is possible for the user to set an alert or alarm that will be activated at the time or moment desired by the user via a message on the display and its screen. The power outlets 92 may be used to charge electronic devices and the adjustable foot support 34 may be unfolded to provide support for the foot and legs when reclining the seat in a completely reclined position. It is also possible to use wireless internet via a WiFi hot spot as part of the multimedia chair.

The multimedia chair may be disabled after a set amount of time and functions can be deactivated by the user after use with an "off" button located on the touch screen of the display or as a separate button located on an arm rest or other chair location depending on the specific design. Once the user is finished and rises from the multimedia chair, the back seat biasing member 58 may bias the back seat 22 forward and lock it so the chair is unusable until activated again.

In one example, it is possible to use a movable aluminum arm with a plastic coated structure or cable to support a touch screen and provide lateral and vertical movement of the screen. It is also possible to use a Bluetooth connection or have the display support a set of headphones with a retractable cord and slot for sliding credit cards. It may be preferred for a user to use Bluetooth so a user can use their own headphones or plug their own headphones into a head phone jack. The right arm rest 26 may have a cover with a spring that contains an aluminum arm that includes the working table and the non-slip surface rubber pad, which is adjustable in position. A lid may be configured to close automatically when the work table has been inserted back into the arm rest, similar to many airplane type passenger seats. A seat may be attached to a fixed support with a folding back rest and foot rest tilting between a rest position and an inclined position.

It is possible to have steel legs and an integrated tubular system for passage of power and network cables that feed the touch screen and credit card payment reader or it may include an outside tube that runs along the base or side support.

Figure 7:
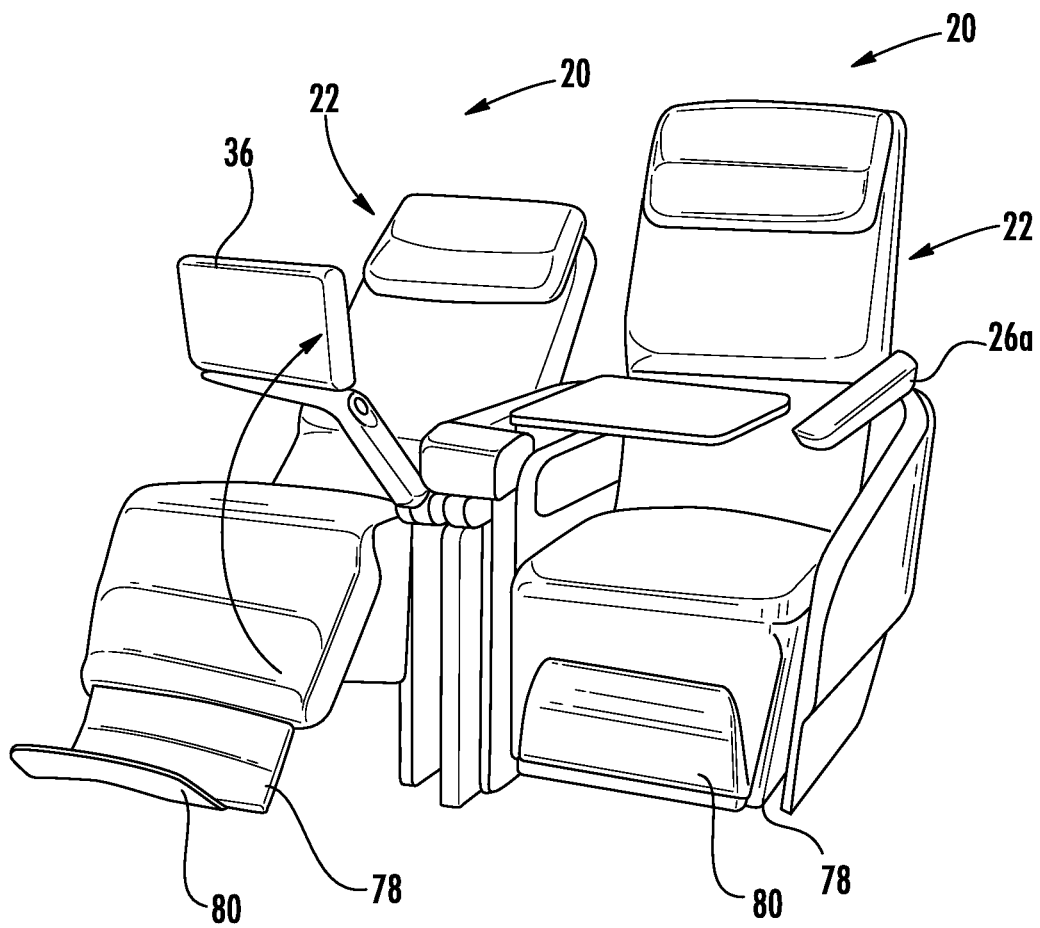
FIG. 7 is a fragmentary front perspective view of two multimedia chairs side-by-side.

Referring now to FIG. 7, there is illustrated two multimedia chairs 20 that are positioned side-by-side. They include basic components as described relative to FIGS. 1-6 but with some slight modifications in overall appearance in this example. In this example shown in FIG. 7, part of the arm rests 26 include a horizontal arm rest member 26*a* that is connected to a support that extends to the floor.

FIG. 8 shows another design that possibly could be modified for use of a multimedia chair 20' that includes basic components of a seat 24' and back seat 22' that folds all the way to the seat. It may include a frame assembly 96' to support the seat and other components that may be modified in accordance with a non-limiting example.

The multimedia chair 20 may be formed in different configurations such as an ottoman. The controller 42 may include a processor that works in conjunction with the multimedia module and keeps track of different users so that a user could log-in to Amazon, EBay or other websites. Based upon the location of the multimedia chair, different advertisements could be brought forward to the display 36 with an incorporated touch screen based on user preferences and past purchases on different websites such as Amazon. The multimedia module 38 could connect to restaurants and stores that are near the locale and could be displayed on the screen based on user preferences or user history. Different entertainment routines could be established based on user preference. The communications module could communicate via a WiFi network with a communications network such as the internet or have a wired connection to the internet. It is possible for each of the multimedia chairs to be connected to a server that would keep track of what users are accomplishing, buying, or looking at via the multimedia chair. The multimedia module 38 may perform different functions and include a processor and have access to the Internet, entertainment, email, news, weather and other details and websites.

Different chairs may be connected as shown in FIG. 7 forming a cluster or grouping and maintained separately. Different storage devices may be used. The controller, multimedia module and other components may be powered from a power supply at the location.

One advantageous aspect of the multimedia chair as illustrated is it may be easily assembled since the base may be formed and the left and right side supports formed as a one piece unit that receives the seat supports through grooves and cutouts as illustrated. The inside panels of the left and right arm rests could be attached to the respective left and right seat supports and the support rod extended through the support rod receiving channels such as formed similar to pipes. The seat is inserted over the seat supports. The support rod for the front portion of the seat can be quickly attached and similarly the first and second plates attached perhaps through insertion of members within grooves or receiving slots of the support rod.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A multimedia chair comprising:
 a base having opposing seat supports and opposing side supports;
 a seat connected to said seat supports;
 an arm rest attached to each side support;
 a controller;
 a display supported by one of said arm rests and connected to said controller;
 a multimedia module connected to said controller;
 an adjustable foot support pivotably attached to the seat,
 a foot support locking device connected to the adjustable foot support and said controller and actuated by said controller, wherein said adjustable foot support is initially in a stowed, locked and disabled position when the multimedia chair is not in use and optionally extends outward when the foot support locking device is activated by said controller and unlocked;
 a back seat comprising a support rod pivotably connected between said opposing side supports and a back seat member carried by said support rod;
 a back seat locking device supported by one of said side supports and connected to said back seat and said controller and actuated by said controller, wherein said back seat is initially in a forward, locked and disabled position making the multimedia chair unusable and movable rearward into an enabled position for use of the multimedia chair when said back seat locking device is activated by said controller and unlocked, said back seat locking device further comprising a locking pin that engages said support rod to lock the back seat into the forward, locked and disabled position; and a user authorization module connected to said controller, wherein upon receiving a credit card authorization or wireless authorization signal from a wireless device of a potential user, said controller unlocks the foot support locking device and back seat locking device and actuates the display and multimedia module for use of the multimedia chair by the user.

2. The multimedia chair according to claim 1 wherein said seat and back seat each include a vibrating element connected to said multimedia module and controlled therefrom for imparting a vibration to the user.

3. The multimedia chair according to claim 1 wherein said display is pivotably supported by one of said arm rests and movable from a retracted position when the multimedia chair is not in use and into an extended position when in use.

4. The multimedia chair according to claim 1 further comprising an adjustable table connected to said arm rest that supports said display.

5. The multimedia chair according to claim 1 wherein each seat support comprises a flange and said seat is configured to be slidably received on each flange.

6. The multimedia chair according to claim 1 wherein said back seat further comprises a support plate connected to said support rod, wherein said back seat member is carried by said support plate.

7. The multimedia chair according to claim 1 wherein said authorization module comprises a credit card reader carried by one of said arm rests.

8. The multimedia chair according to claim 1 wherein said controller is positioned within one of said arm rests.

9. The multimedia chair according to claim 1 further comprising a biasing mechanism connected to the back seat and configured to bias said back seat into said forward, locked, and disabled positions.

10. A multimedia chair comprising:
a base having opposing seat supports and opposing side supports;
a seat connected to said seat supports;
an arm rest attached to each side support;
a controller;
a display supported by one of said arm rests and connected to said controller;
a multimedia module connected to said controller;
an adjustable foot support pivotably attached to the seat,
a foot support locking device connected to the adjustable foot support and said controller, wherein said adjustable foot support is initially in a stowed, disabled position when the multimedia chair is not in use and optionally extends outward when the foot support locking device is activated by said controller and unlocked;
a back seat comprising a support rod pivotably connected between said side supports, a support plate carried by said support rod, and a back seat member carried by said support plate,
a back seat locking device supported by one of said side supports and actuated by said controller and comprising a locking pin that engages said support rod to lock the back seat into a forward, locked, and disabled position; and
a user authorization module connected to said controller, wherein upon receiving a credit card authorization or wireless authorization signal from a wireless device of a potential user, said controller unlocks the foot support locking device and back seat locking device and actuates the display and multimedia module for use of the multimedia chair by the user.

11. The multimedia chair according to claim 10 wherein said support rod includes a mounting groove and said support plate includes an edge configured to fit within said mounting groove and said back seat member includes side channels that are slidably received on said support plate to retain the back seat member thereon.

12. The multimedia chair according to claim 10 further comprising a biasing mechanism connected to said back seat and configured to bias said back seat into said forward, locked, and disabled positions.

13. The multimedia chair according to claim 10 wherein said seat and back seat member each include a vibrating element connected to said multimedia module and controlled therefrom for imparting a vibration to the user.

14. The multimedia chair according to claim 10 wherein said display is pivotably supported by one of said arm rests and movable from a retracted position when the multimedia chair is not in use and into an extended position when in use.

15. The multimedia chair according to claim 10 further comprising an adjustable table connected to said arm rest that supports said display.

16. The multimedia chair according to claim 10 wherein each seat support comprises a flange and said seat is configured to be slidably received on each flange.

17. The multimedia chair according to claim 10 wherein said authorization module comprises a said credit card reader carried by one of said arm rests.

18. The multimedia chair according to claim 10 wherein said controller is positioned within one of said arm rests.

* * * * *